United States Patent [19]

Dhein et al.

[11] 4,129,537
[45] Dec. 12, 1978

[54] AIR-DRYING ACRYLATE LACQUER BINDERS

[75] Inventors: Rolf Dhein, Krefeld; Lothar Fleiter, Krefeld-Traar, both of Germany

[73] Assignee: Bayer Aktiengesellschaft, Leverkusen-Bayerwerk, Germany

[21] Appl. No.: 842,042

[22] Filed: Oct. 14, 1977

[30] Foreign Application Priority Data

Oct. 20, 1976 [DE] Fed. Rep. of Germany ....... 2647314

[51] Int. Cl.$^2$ .......................... C09D 3/58; C09D 3/74
[52] U.S. Cl. ........................ 260/23 EP; 260/23 AR; 260/23 ST
[58] Field of Search ......... 260/23 EP, 23 AR, 23 ST, 260/22 EP

[56] References Cited

U.S. PATENT DOCUMENTS

| 3,856,725 | 12/1974 | Montesissa et al. | 260/18 EP |
| 3,928,157 | 12/1975 | Suematsu et al. | 260/29.6 HN |

FOREIGN PATENT DOCUMENTS

| 767476 | 2/1957 | United Kingdom | 260/23 EP |
| 793776 | 4/1958 | United Kingdom | 260/23 EP |
| 1227398 | 4/1971 | United Kingdom | 260/23 EP |
| 1313652 | 4/1973 | United Kingdom | 260/23 EP |
| 1399159 | 6/1975 | United Kingdom | 260/23 EP |

*Primary Examiner*—Ronald W. Griffin

*Attorney, Agent, or Firm*—Connolly and Hutz

[57] ABSTRACT

An air-drying lacquer binder comprising a copolymer of copolymerized units of
  20 to 55% by weight of styrene,
  5 to 30% by weight of glycidyl(meth)acrylate, and
  0 to 50% by weight of at least one (meth)acrylic acid ester with 1 to 10 carbon atoms in the alcohol component,
which has been esterified with
  0 to 15% by weight of at least one natural, drying fatty acid, and
  10 to 50% by weight of isomerized drying fatty acids
(the sum of the percentage contents amounting to 22 – 50 percent by weight) based on the copolymer and drying fatty acids and dicarboxylic acid anhydride subsequently used, up to an acid number of <10, from 30 to 75% by wt. of the isomerised drying fatty acids containing conjugated double bonds, and wherein the hydroxyl groups formed have, subsequently, been reacted with from 0.5 to 3% by weight, based on the total components of the binder, of tetrahydrophthalic acid anhydride and/or at least one isomer thereof. The lacquer binders possess very good pigment absorbing and wetting properties, very good lacquer-grade processibility and even after the addition of an anti-skinning agent constant drying times under constant drying conditions.

4 Claims, No Drawings

AIR-DRYING ACRYLATE LACQUER BINDERS

This invention relates to air-drying lacquer binders of copolymers of styrene, (meth)acrylates and glycidyl(meth) acrylate which, after copolymerisation, are esterified with 22–50% of air-drying fatty acid mixtures and subsequently reacted with tetrahydrophthalic acid anhydride, the drying fatty acids consisting of (A) 10 to 50% by weight of isomerised drying fatty acids containing from 30 to 75% by weight of fatty acids having conjugated unsaturated linkages, and (B) 0 to 15% by weight of natural, drying fatty acids, and the semiesters preferably having acid numbers of from 5 to 15.

It is known that copolymers of styrene and glycidyl methacrylate can be reacted with drying fatty acids with addition of the carboxyl groups of the fatty acid to the epoxide groups of the copolymer, and that the reaction products thus obtained can be used as air-drying lacquer binders (cf. British Patent No. 767,476).

It is also known that copolymers of glycidyl(meth) acrylate and vinyl or vinylidene monomers can be reacted with drying fatty acids and the resulting reaction products used as air-drying lacquer binders. In this case, the vinyl or vinylidene monomers are vinyl toluene, (meth)acrylonitrile and (meth)acrylic acid esters (cf. British Patent No. 793,776).

According to the two above-mentioned British Patent Specifications, the drying fatty acids used may be those of linseed oil, dehydrated castor oil, China wood oil, etc. Whereas linseed oil fatty acid contains hardly any conjugated double bonds, the fatty acids of dehydrated castor oil contain from 72 to 98% of di-unsaturated $C_{18}$-fatty acids, of which on average only 25% are conjugated, whilst the fatty acids of China wood oil contain approximately 80% of eleostearic acid which contains 100% conjugated double bonds (D. Hummel: Kunststoff, Lack und Gummi-Analyse, 1958, pages 94 to 97). A major disadvantage of the binders according to the British Patent Specifications is the inadequate gloss of the pigmented lacquers which is caused by inadequate pigment wetting.

According to German Offenlegungsschrift No. 1,720,697 this deficiency is overcome by producing copolymers from at least one vinyl monomer and at least one comonomer containing epoxide groups, esterifying the copolymers thus produced with drying fatty acids and reacting the hydroxyl groups formed during esterification with the dicarboxylic acid anhydride to form semiester groups. Acid numbers of from about 20 to about 60, based on the binder, are necessary for obtaining an adequate effect.

The drying fatty acids recommended for use are those of linseed oil, soya oil, cottonseed oil, safflower oil, tall oil and sunflower oil which contain hardly any conjugated fatty acids, i.e. have a very low content of conjugated fatty acids. Suitable dicarboxylic acid anhydrides are aliphatic, cycloaliphatic or aromatic dicarboxylic acid anhydrides. The binders thus modified show very good pigment absorbing and wetting properties, dry quickly in relatively constant drying times, can be satisfactorily processed by the techniques normally used in the production of lacquers and give films combining good elasticity with hardness. However, like many air-drying lacquers, the finished lacquers show a tendency towards undesirable skin formation and thickening when stored in tins, so that they necessitate the addition of an anti-skinning agent. Unfortunately, the added anti-skinning agent considerably increases the drying time even under the same drying conditions, so that binders of this type are not suitable for the production of air-drying lacquers.

Products with the same drying mechanism are also described in German Offenlegungsschrift No. 2,247,146 which seeks to produce fatty-acid-modified acrylates with properties similar to alkyd resins by using alkyl styrenes as monomer instead of the inexpensive styrene. In this case, too, semiester formation has to be carried out to such an extent that, as shown in the Examples, acid numbers of at least 16 are obtained. Products of this type may also contain ricinene fatty acids and commercialgrade linoleic acid, their degree of conjugation being regarded as high. However, it is known that commercialgrade linoleic acid only contains traces of conjugated fatty acid whilst ricinene fatty acid contains on average only 30% by weight of conjuene acid. Thus, only 10% by weight of conjugated fatty acid is used in Example 7 (German Offenlegungsschrift No. 2,247,146).

An object of the present invention is to modify the air-drying binders according to German Offenlegungsschrift No. 1,720,697 in such a way that, in addition to very good pigment absorbing and wetting properties, very good lacquer-grade processibility and considerable hardness combined with good elasticity and high gloss of the dried film, even after the addition of an anti-skinning agent, are obtained at constant drying times under constant drying conditions.

According to the invention, this object is achieved by selecting special copolymers according to German Offenlegungsschrift No. 1,720,697 which have been esterified with special mixtures of natural and isomerised drying fatty acids and subsequently reacted with a selected dicarboxylic acid anhydride, namely tetrahydrophthalic acid anhydride or its isomers.

It was by no means obvious to use mixtures of drying fatty acids with an extremely high content of conjuene fatty acids in order to obtain stability of the drying times in the presence of an anti-skinning agent, because all that was known of the conjuene oils and hence of the corresponding fatty acids was that they dry more quickly than isolene oils and the corresponding fatty acids (cf. Ullmanns Enzyklopadie der technischen Chemie (1966), Vol. 17, page 177, § Konjuenole, paragraph 2). However, the problem to be solved was far less, if at all, a matter of reducing the drying times than a matter of stabilising the drying times of the finished lacquer following the addition of an anti-skinning agent. This effect was not foreseeable. In addition, a high content of conjuene fatty acid units in the binder had been expected to give rise to a considerable deterioration of the property spectrum of the films, because it was known that the frostwork effect and the wrinkling or crystallisation of the films is typical of all conjuene oils (cf. Ullmanns Enzyklopadie der technischen Chemie (1966), Vol. 17, page 771, § Konjuenole, paragraph 2). Finally, it was not foreseeable that tetrahydrophthalic acid anhydride in particular would be particularly suitable for semi-ester formation, generally, within specially selected acid number limits of 5 to 15. Other dicarboxylic acid anhydrides, such as for example phthalic acid anhydride or maleic acid anhydride, and other acid number ranges adversely affect in particular the resistance to marking by adhesive tape of the dried-on film.

Accordingly, the present invention provides air-drying lacquer binders of copolymers of copolymerised have substantially the following composition in % by weight:

|  |  | Linseed oil | Soya oil | Sunflower oil | Cottonseed oil | Peanut oil | Tall oil | Safflower oil |
|---|---|---|---|---|---|---|---|---|
| Myristic acid | ($C_{14}$) | 0.2 | — | — | 3.3 | 0.5 | — | 0.1 |
| Palmitic acid | ($C_{16}$) | 5.6 | 6.5 | 3.5 | 19.9 | 7.8 | 4.6 | 4.5 |
| Stearic acid | ($C_{18}$) | 3.5 | 4.5 | 2.9 | 1.3 | 3.1 | 4.6 | 2.0 |
| Arachic acid | ($C_{20}$) | 0.6 | 0.7 | 0.6 | 0.6 | 2.4 | — | 0.4 |
| Behenic acid | ($C_{22}$) | — | — | — | — | 3.1 | — | 0.4 |
| Lignoceric acid | ($C_{24}$) | 0.1 | — | 0.4 | — | 1.1 | — | — |
| Oleic acid | ($C_{18}$) | 21.0 | 33.5 | 34.1 | 29.6 | 56.0 | 30 | 20 |
| Linoleic acid | ($C_{18}$) | 24.0 | 52.5 | 58.5 | 45.3 | 26.0 | 24 | 70 |
| Linolenic acid | ($C_{18}$) | 45.0 | 2.3 | — | — | — | 8 | 3 | units of
 20 to 55% by weight of styrene,
 5 to 30% by weight of glycidyl (meth)acrylate, and
 0 to 50% by weight of at least one (meth)acrylic acid ester containing 1 to 10 carbon atoms in the alcohol component,
which have been esterified with 22 to 50% by weight of drying fatty acids, based on the copolymer and drying fatty acids and dicarboxylic acid anhydride, up to an acid number of < 10 and the hydroxyl groups formed subsequently reacted with dicarboxylic acid anhydride, distinguished by the fact that from 0 to 15% by weight of natural, drying fatty acids, and from 10 to 50% by weight of isomerised drying fatty acids (the sum of the percentage contents must amount to 22 to 50% by weight)
are used as drying fatty acids, based on the copolymer and drying fatty acids and dicarboxylic acid anhydride, from 30 to 75% by weight of the isomerised drying fatty acids containing conjugated double bonds, and from 0.5 to 3 percent by weight, based on the total components of the binder, of tetrahydrophthalic acid anhydride or its isomers or mixtures of these anhydrides are used as dicarboxylic acid anhydride.

The copolymers preferably consist of copolymerised units of
 20 to 45% by weight of styrene,
 10 to 25% by weight of glycidyl acrylate, glycidyl methacrylate or mixtures thereof, and
 10 to 30% by weight of at least one ester of acrylic or methacrylic acid with 1 to 4 C-atoms in the alcohol component.

The copolymers are preferably esterified with 25 to 40% by weight of drying fatty acids up to an acid number of < 10 and from 0 to 10% by weight of natural, drying fatty acids, and from 25 to 40% by weight of isomerised, drying fatty acids (the sum of the percentage contents must amount to 25 to 40% by weight) are preferably used as drying fatty acids, based on the copolymer and drying fatty acids and dicarboxylic acid anhydrides, from 40 to 60% by weight of the isomerised drying fatty acids containing conjugated double bonds.

These fatty-acid-modified copolymers are preferably reacted with 0.5 to 3% by weight of tetrahydrophthalic acid anhydride to form semiesters preferably having an acid number in the range of from 5 to 15.

Natural, drying fatty acids are, for example, the fatty acids of linseed oil, soya oil, sunflower oil, cottonseed oil, peanut oil, tall oil and safflower oil in their natural composition, i.e. these natural drying fatty acids are mixtures of saturated, mono- and/or poly-unsaturated fatty acids with drying properties, the poly-unsaturated fatty acids essentially having isolated double bonds. For example, the fatty acids of the above-mentioned oils have substantially the following composition in % by weight:

The natural drying fatty acids contain approximately
 5 to 25% by weight of saturated $C_8$-$C_{24}$-fatty acids,
 20 to 60% by weight of monoolefinically unsaturated $C_{18}$-fatty acids, especially oleic acid, and
 20 to 75% by weight of tri- and/or di-unsaturated $C_{18}$-fatty acids having essentially isolated double bonds.

The isomerised drying fatty acids to be used in accordance with the invention contain from 30 to 75% by weight of conjugated fatty acids and may be obtained by isomerising the natural, drying fatty acids. Conjugated fatty acids are $C_{18}$-fatty acids with at least two conjugated double bonds. The following are mentioned by way of example: 9,11-linoleic acid, 10,12-linoleic acid, 8,10-octadecadiene acid, eleostearic acid (= 9,11,13-octadecatriene acid), pseudoeleostearic acid (= 10,12,14-octadecatriene acid), parinaric acid (= 9,11,13,15-ocatadecatetraene acid), licanic acid (= 4-keto-9,11,13-octadecatriene acid) and the stereoisomers of the above-mentioned acids, preferably 9,11-linoleic acid and eleostearic acid and their stereoisomers.

The isomerisation of the natural, drying fatty acids can be carried out by known methods and is described, for example, in Ullmanns Enzyklopädie der technischen Chemie, (1956), Vol. 7, pages 538–539.

The acids mentioned above are described, for example, in Ullmanns Enzyklopädie der technischen Chemie (1956), Vol. 7, pages 468–486. See also Beilsteins Handbuch der organischen Chemie (1961), 4th Edition, Vol. 2, Third Supplement, pages 1476 to 1520.

The copolymers which are used for esterification with the drying fatty acids and for semiester formation with tetrahydrophthalic acid anhydride are obtained by known polymerisation processes, for example by the process described in German Offenlegungsschrft No. 1,720,697. They contain the incorporated monomers in statistical distribution and have average molecular weights ($M_n$, number average) of from about 3000 to 20,000, especially from 4000 to 10,000, as determined in tetrahydrofuran by the vapour pressure reduction method. Lower molecular weights adversely affect the drying activity, even in the presence of oximes.

The reaction of the drying fatty acids with the copolymers containing epoxide groups is carried out, preferably in the absence of catalysts, at temperatures generally in the range of from 60° to 200° C., preferably in the range of from 100° to 170° C., in organic solvents, such as xylene or solvent naphtha, to such an extent that the acid number, based on solvent-free binder (= copolymer + drying fatty acid) is below 10, preferably below 6.

The drying fatty acids may be used in quantities of from 22 to 50% by weight, based on the solid resin (copolymer + fatty acids + dicarboxylic acid anhydride), and are preferably used in quantities of from 25 to 40% by weight.

The reaction of the tetrahydrophthalic acid anhydride or its isomers or mixtures of these anhydrides with the hydroxyl groups of the fatty-acid-containing copolymers obtained to form the semiesters is, generally, carried out at temperatures of from about 50° C. to 180° C. preferably from 100° to 140° C. The dicarboxylic acid anhydride is, generally, used in such quantities that the acid number, based on the binder after semiester formation, is in the range of from 5 to 20 and preferably in the range of from 5 to 15. The dicarboxylic acid anhydride is used in quantities of from 0.5 to 3% by weight, based on the total components of the binder (copolymer + fatty acids + dicarboxylic acid anhydride). Higher acid numbers retard drying to a considerable extent in the presence of oxides.

The binders according to the invention are distinguished by excellent pigment absorbing and wetting properties, minimal yellowing, rapid drying and good lacquer-grade processibility and give hardened films with high gloss, good elasticity and hardness. The decisive advantage over the prior art (cf. German Offenlegungsschrift No. 1,720,697) which enables them to be used on a commercial scale is the fact that the above-mentioned properties remain intact, even after the addition of an anti-skinning agent, and that there is no delay in drying at room temperature.

The binders according to the invention are dissolved in known manner in organic solvents, for example xylene, mixtures of aromatic solvents, ethylene glycol acetate or mixtures of white spirit and the foregoing solvents, and are processed, optionally, in the form of clear lacquers, but preferably pigmented with conventional pigments, with such additives was levelling agents, drying agents, etc., in the usual quantities.

Aldoximes, or ketoximes, for example butanone oxime, may be used as anti-skinning agents in quantities of from 0.1 to 2.0% by weight, based on solid binder.

The new binders according to the invention may form the sole binder of a lacquer system, although they may of course also be combined with other resins for modifying properties, as is standard practice in lacquer chemistry.

In order to vary the properties of the films obtained, it is also possible (and this is another particular advantage) to add to the binders according to the invention polyisocyanates and melamine resins which, through any hydroxyl groups which may be present, produce an additional crosslinking effect, provide the fresh lacquer coatings with greater hardness and resistivity and enable the articles to which they are applied to be assembled more quickly.

The lacquer films may be applied by standard methods, such as spread coating, spray coating, dip coating or knife coating, etc., to suitable substrates, for example of metal, wood, paper, glass, ceramics, stone, concrete, plastics etc. The lacquer films are generally dried at temperatures of from 15° to 30° C., although they may also be dried at lower or higher temperatures.

The percentage contents and parts quoted in the Examples are percentages and parts by weight, unless otherwise stated.

EXAMPLE 1

(a) A copolymer is produced by solution polymerisation using standard methods, for example the method described in Example 1 of German Offenlegungsschrift No. 1,720,697, from 122.4 parts of styrene, 63.2 parts of methyl methacrylate, 32.0 parts of n-butylacrylate, 58.4 parts of glycidyl methacrylate, 2.8 parts of azodiisobutyronitrile, 1.4 parts of dodecyl mercaptan and 264 parts of solvent naphtha at a temperature of 110° C. To complete the copolymerisation reaction, further quantities of 0.08 part of azoisobutyronitrile are added at intervals of 2 hours over a total period of 24 hours until a copolymer solution with a solids content of 56.2% is obtained. After dilution with solvent naphtha to a solids content of 50%, the copolymer solution has a viscosity of 169 seconds according to DIN 53211. The copolymer consists of copolymerised units of 44.3% of styrene, 22.7% of methyl methacrylate, 11.8% of n-butylacrylate and 21.1% of glycidyl methacrylate.

(b) The esterification reaction with isomerised, drying fatty acids is carried out with a mixture of 31% of monounsaturated $C_{18}$-fatty acids (essentially oleic acid), 10% of tri-unsaturated $C_{18}$-fatty acid (essentially linolenic acid and eleostearic acid) and 51% of di-unsaturated $C_{18}$-fatty acid (essentially 9,12- and 9,11-linoleic acid), approximately 45% of the di- and tri-unsaturated fatty acids containing conjugated double bonds. The mixture also contains approximately 5% of palmitic acid, 2% of myristic acid and 1% of stearic acid.

610.2 parts of the 50% copolymer solution described in (a) are esterified with 115 parts of the fatty acid mixture defined above at a temperature of 160° C. until an acid number, based on solvent-free esterification product, of 4 is reached. The solution has a solids content of 57.3%.

(c) To 705.2 parts of the 57.3% solution of the esterification product obtained in accordance with (b) are added 5.5 parts of tetrahydrophthalic acid anhydride, corresponding to 1.34%, based on solids (copolymer + fatty acids + dicarboxylic acid anhydride), followed by heating to 130° C. until the resulting solution of the semiester obtained has a solids content of 58.8%, a viscosity of 7190 cP at 20° C., an acid number, based on solvent-free semiester product, of 9.9 and a hydroxyl number of 47. The average molecular weight (number average $\overline{M}_n$ as determined by oxmometry in tetrahydrofuran) amounts to approximately 5000. This binder has a content of isomerised fatty acid mixture of 28.5% by weight.

(d) (Recipe A) A white lacquer produced from:
170 parts of binder solution according to c) (58.8% solids)
65 parts of titanium dioxide pigment (rutile)
64 parts of xylene
1.2 parts of zinc octoate solution (8% metal content)
3 parts of ethylene glycol acetate
1.5 parts of anti-skinning agent (approximately 55% solution of butanone oxime in white spirit)
3 parts of silicone oil solution, 1% in xylene
1 part of cobalt octoate solution (6% metal content)
3.3 parts of zirconium solution (6% metal content)
shows the results set out in the Table under Example 1 A).

Comparison 1

This comparison test shows that white lacquers of binders according to German Offenlegungsschrift No. 1,720,697 take much longer to dry to a tack-free condition, even after the addition of standard anti-skinning agents, and, depending upon the recipe selected, gel prematurely or give films with poorer properties than white lacquers produced with binders according to the invention. White lacquers produced with binders according to German Offenlegungsschrift No. 1,720,697 have no shelf life in the absence of an anti-skinning agent.

According to Example 1 of German Offelegungsschrift No. 1,720,697, a solution of 120 g of styrene, 78 g of methyl methacrylate and 102 g of glycidyl methacrylate in 500 g of xylene is heated under nitrogen for 25 hours to 80° C. following the addition of 2.8 g of azodiisobutyronitrile as catalyst and 0.8 g of dodecyl mercaptan as regulator. Thereafter, the conversion amounts to 100% and a clear colourless polymer solution is obtained with an acid number of 1 and flow-out viscosity (DIN-4-cup) of 28 seconds at 20° C.

This solution is stirred under nitrogen for 8 hours at 140° C. following the addition of 194 g of a commercial-grade linoleic acid having an acid number of 200. Thereafter, the acid number amounts to 5, indicating that the reaction of the fatty acid with the copolymer is substantially complete.

The clear, light yellow reaction solution is then stirred under nitrogen for 75 minutes at 140° C. with 25 g of phthalic acid anhydride, after which a lacquer solution with a solids content of approximately 50% by weight and an acid number of 16, corresponding to an acid number of approximately 32, based on solid binder, is obtained.

Recipe B 65 g of titanium dioxide pigment (rutile) and 1.25 g of clacium naphthenate (used in the form of a solution in xylene with a metal content of 4% by weight) are added to 200 g of the polymer solution obtained. This mixture is then ground twice on a three-roll stand. 20 g of xylene, 3 g of ethylene glycol, 2 g of butanone oxime, 2 g of silicone oil (5% in xylene), 1.7 g of cobalt napthenate (used in the form of a solution in xylene with a metal content of 6% by weight) and 2.1 g of lead naphthenate (used in the form of a solution in xylene with a metal content of 24% by weight) are then added to the paste thus obtained, followed by dilution with xylene/turpentine oil (ratio by volume 8:2) to the viscosity required for spraying. The comparison test shows a delay in drying of more than 10 hours caused by oximes (Table, Comparison 1 B).

By contrast, the white lacquer according to recipe B, but without any butanone oxime or any other anti-skinning agent added, has no shelf life. The lacquer forms a skin within a few hours and gels after storage for about 1 day. The same result is obtained with a white lacquer produced with the binder of Comparison 1 in accordance with recipe A of Example 1 (cf. Table, Comparison 1 A). In this case, too, the lacquer thickens and gels after about 1 day, despite the presence of oxime in the recipe.

EXAMPLE 2

The polymerisable monomers are incorporated into the copolymer in substantially the same ratio in which they are used. This also applies to the following Examples and Comparisons.

The binder according to the invention is produced from:
24.99% of styrene
12.90% of methyl methacrylate
20.51% of glycidyl methacrylate
40.52% of an isomerised, drying fatty acid mixture of 16% of saturated fatty acids ($C_8$- $C_{18}$-fatty acids: (caprylic acid, lauric acid, myristic acid, palmitic acid and stearic acid)
25% of mono-unsaturated $C_{18}$-fatty acid (oleic acid)
58% of di-unsaturated $C_{18}$-fatty acid, 48 to 52% of the di- and tri-unsaturated fatty acids being conjugated (9,11- and 9,12-linoleic acid),
1% of tri-unsaturated $C_{18}$-fatty acid (linolenic acid and oleostearic acid) and
1.08% of tetrahydrophthalic acid anhydride, by the following procedure:

In a first reaction stage, 934.2 parts of styrene, 482.4 parts of methyl methacrylate, 766.8 parts of glycidyl methacrylate, 22.38 parts of azodiisobutyronitrile and 11.16 parts of dodecyl mercaptan are polymerised in 2088.6 parts of xylene at a temperature of 110° C., the monomer mixture being added dropwise to the xylene over a period of 2.5 hours at 110° C., kept at that temperature for 3 hours and then polymerised over a period of 24 hours at 110° C. by the addition at 2-hourly intervals of further quantities of 0.63 part of azodiisobutyronitrile until the polymer solution has a solids content of 55.3% and a viscosity of 213 seconds in a 6 mm Ford cup.

1278.0 parts of the isomerised drying fatty acid mixture indicated above are then added to 3857.0 parts of the polymer solution diluted with xylene to a solids content of 49.3%, followed by esterification at 140° C. until the product has an acid number of 9.6, based on the solvent-free product, and a viscosity of 479 seconds (50% solution in xylene in accordance with DIN 53 211).

4706.0 parts of the esterification product, diluted with xylene to a solids content of 60.3%, are reacted with 31.0 parts of tetrahydrophthalic acid anhydride at 125° C. until the end product has an acid number of 11.2 and a hydroxyl number of 70, based on the solvent-free product. The solids content amounts to 59.2%. The viscosity of a 50% solution in xylene amounts to 510 seconds (DIN 53 211). The binder has a content of isomerised fatty acid mixture of 40% by weight.

A white lacquer is produced from the binder obtained in accordance with recipe A of Example 1. The results of the lacquer tests are set out in the Table under Example 2. By contast, Comparison tests 2 and 3 show that, if the limits according to the invention are not observed, for example by using an excessive amount of natural drying fatty acids of linseed oil or sunflower oil which are not conjugated, or small amounts of conjuene acids, much poorer lacquer properties are obtained. The results are set out in the Table under the headings Comparison 2 A and Comparison 3 A.

Comparison 2

The binder used for Comparison test 2 is produced from the following starting materials:
24.99% of styrene
12.90% of methyl methacrylate
20.51% of glycidyl methacrylate
20.26% of an isomerised, drying fatty acid mixture according to Example 2.
20.26% of linseed oil fatty acid (natural, drying fatty acids) consisting essentially of 15% of saturated fatty acids 20% of oleic acid 15% of 9,12-linoleic acid 50% of 9,12,15-linolenic acid and
1.08% of tetrahydrophthalic acid anhydride
by the method of Example 2 and processed into a white lacquer in the same way as described in that Example.

The binder has a content of isomerised drying fatty acids of 20% by weight which is still within the claimed limits of the present Application, and a content of natural drying fatty acids of 20% by weight which is above the claimed limits. The binder has a lower drying activity, a distinctly lower nail hardness and a distinctly lower pendulum hardness (see Table, Comparison 2 A), despite the presence in it of the fatty acids of linseed oil which are known to have very good drying properties.

Comparison 3

The binder of Comparison test 3 is produced from the following starting materials:
24.99% of styrene
12.90% of methyl methacrylate
20.51% of glycidyl methacrylate
20.26% of an isomerised drying fatty acid mixture according to Example 2
20.26% of sunflower oil fatty acid (natural, drying fatty acid) consisting essentially of: 15% of saturated fatty acids 24% of oleic acid 60% of 9,12-linoleic acid 1% of 9,12,15-linolenic acid and
1.08% of tetrahydrophthalic acid anhydride,
by the method of Example 2 and processed into a white lacquer in the same way as described in that Example.

This binder has a content of isomerised drying fatty acids of 20% by weight which is still within the limits according to the invention and a content of natural, isolated unsaturated fatty acids of 20% by weight which is above the limits according to the invention. The binder also shows lower drying activity, poorer nail hardness and poorer pendulum hardness (cf. Table, Comparison 3 A), despite the presence in it of the fatty acids of soya oil which are known to have very good drying properties.

The following Example 3 according to the invention and the associated Comparison test 4 demonstrate the importance of the molecular weights which also form a selection limit.

EXAMPLE 3

An air-drying acrylate is produced from
31.83% of styrene
16.32% of methyl methacrylate
8.35% of butyl acrylate
15.06% of glycidyl methacrylate
27.07% of an isomerised, drying fatty acid mixture of
  8% by weight of saturated fatty acid
  31% by weight of mono-unsaturated $C_{18}$-fatty acid
  51% by weight of di-unsaturated $C_{18}$-fatty acid
  10% by weight of tri-unsaturated $C_{18}$-fatty acid, 45% of the di- and tri-unsaturated fatty acids being conjugated, and
1.37% of tetrahydrophthalic acid anhydride,
by adding the monomers, initiators and chain terminators dropwise to xylene over a period of 2.5 hours at a temperature of 110° C., in the same way as in Example 2. In order to complete the reaction, quantities of 0.61 part of azodiisobutyronitrile are then added at intervals of 2 hours until a polymer with a solids content of 55.8% and a viscosity of 58 seconds (45% solution in xylene in accordance with DIN 53 211) is obtained. The polymer thus obtained is then esterified with the isomerised drying fatty acid mixture indicated above at a temperature of 140° C. until an acid number of 6, based on the solvent-free esterification product, and a viscosity of 207 seconds (50% solution in xylene in accordance with DIN 53 211) are obtained. This esterification product is converted into the semiester at 120° C. with the specified quantity of tetrahydrophthalic acid, and thereafter has an acid number of 10, based on the solvent-free binder, a viscosity of 372 seconds (50% solution in xylene in accordance with DIN 53 211) and a molecular weight $\overline{M}_n$ of 4600 (as determined by osmometry in tetrahydrofuran).

The binder is processed into a white lacquer in accordance with Example 1, recipe A. The lacquer data and film properties are shown in the Table under the heading Example 3 A.

Comparison 4

The procedure of Example 3 was repeated with the modification that, instead of 0.60 part of dodecyl mercaptan, 2.0 parts of dodecyl mercaptan, based on the finished binder, were used as chain terminator. A comparison product with an acid number of 10, a viscosity of 103 seconds (50% solution in xylene in accordance with DIN 53 211) and a molecular weight $\overline{M}_n$ of 2800 in formed.

The binder obtained is processed into a white lacquer in accordance with Example 1, recipe A.

Although this low molecular weight comparison product, whose other characteristics correspond to the selection according to the invention, also shows adequate drying and hardness values, it fails completely in regard to the required resistance of the films, dried for example overnight, to marking by adhesive tape or to petrol.

In multiple lacquering, a first colour is applied, dried and those areas which are to retain this colour are covered with paper and the boundary edges are carefully stuck down with adhesive tape. The second colour is then applied to those areas to be provided with a different colour and is also dried. The masking paper and adhesive tape are then removed. The tape should not leave behind any impressions or other marks. In order to test this property, therefore, an adhesive tape is pressed onto a dried lacquer finish, left there, subsequently peeled off and a visual assessment made as to whether an impression is left behind (5) or whether the impression completely disappears again after a while (0).

Even 6 hours after removal of the adhesive tape, the comparison still shows the full impression, indicating that this white lacquer is unsuitable for multiple lacquering.

For automotive lacquers, particular importance is also attributed to the resistance of fresh lacquer finishes to petrol (fuel) especially super-grade petrol, for example when petrol overflows onto the fresh lacquer during filling. The lacquer finishes should not undergo any (permanent) changes, such as wrinkling, matting or dissolution. For simulated laboratory testing, the lacquer sprayed onto glass plates or bodywork panels is dried, for example for 16 hours at 20° C. A pad soaked with super-grade petrol is then applied for 1 minute. Following removal of the pad, the test surface is evaluated on a scale of 0 to 5 and, in the event of pronounced, permanent change, for example in the form of matting, wrinkling or dissolution, is given the mark 5 and, in the event of no (visible) change, the mark 0.

The results of Comparison 4 are set out in the Table under the heading Comparison 4 A.

The following Comparison test 5 is another variation of Example 3 which shows that considerable importance is also attached to the monomers selected.

Comparison 5

A styrene-free comparison product with the following composition:
37.57% of methyl methacrylate
19.29% of butyl acrylate
14.83% of glycidyl methacrylate
26.97% of isomerised drying fatty acids according to Example 3 and
1.34% of tetrahydrophthalic acid anhydride
is produced by copolymerising the monomers in xylene at 110° C., as described in Example 3. A copolymer with a viscosity of 44 seconds (45% solution in xylene in accordance with DIN 53 211) is formed after comparable reaction times.

Esterification with the fatty acids is also carried out as in Example 3 up to a viscosity of 56 seconds (50% solution in xylene in accordance with DIN 53211). The semiester is then produced by reaction with tetrahydrophthalic acid anhydride at a temperature of 120° C. The comparison product then has an acid number of 11 and a viscosity of 263 seconds (50% in xylene in accordance with DIN 53 211).

Despite the fatty acid combination according to the invention, the absence of the other necessary comonomer component (styrene) leads to lacquer starting materials which give inadequately drying lacquer finishes.

The results are set out in the Table under the heading Comparison 5 A.

The following Comparison test 6 demonstrates the other limit to be observed, namely the total content of 22 to 50% by weight of drying fatty acids.

Comparison 6

A binder with the following composition:
34.78% of styrene
17.84% of methyl methacrylate
9.08% of butyl acrylate
16.46% of glycidyl methacrylate
20.34% of an isomerised drying fatty acid mixture according to Example 3 and
1.50% of tetrahydrophthalic acid anhydride
is produced in accordance with Example 3. It differs from the binder of Example 3 in that it contains less than 22% of drying fatty acids.

In the final stage, the comparison product has an acid number of 5 and a viscosity of 570 seconds (50% solution in xylene according to DIN 53 211), dried as a white lacquer (recipe A) in a remarkably short time, but is not resistant to solvents and can be redissolved with petrol, which is a particular disadvantage in the case of repair lacquers for motor vehicles (cf. Table, Comparison 6 A).

The following Comparison test demonstrates the value of tetrahydrophthalic acid anhydride by comparison with phthalic acid anhydride.

Comparison 7

The procedure of Example 3 is repeated with the modification that, instead of tetrahydrophthalic acid anhydride, an equivalent quantity of phthalic acid anhydride is used. The end product obtained has an acid number of 10 and a viscosity of 143 seconds (50% solution in xylene in accordance with DIN 53 211). A white lacquer (recipe A) of this binder dries in the same time as the white lacquer of Example 3 and also shows otherwise comparable properties, coupled with the advantage in terms of drying behaviour of lacquers containing anti-skinning agents, such as white lacquers obtained in accordance with the invention. Above all, however, it shows unacceptable disadvantages in regard to its resistance to marking by adhesive tape and, for this reason, is also unsuitable for use as a vehicle repair lacquer (cf. Table, Comparison 7 A).

Comparison 8

The result of this Comparison test shows that a content in excess of 75% of conjugated double bonds in the drying fatty acids also leads to products with inadequate lacquergrade properties.

The procedure of Example 1 is repeated with the modification that the fatty acid mixture used in Example 1 is replaced by an equivalent quantity (115 parts) of fatty acids of China wood oil (approximately 79.5% of eleostearic acid, 15% of oleic acid, 4% of palmitic acid and 1.5% of stearic acid).

The binders obtained were unsuitable for lacquer purposes.

Explanations to Table I

Layer thickness of the dried films: 50 μm
Substrate: glass plates and bodywork panels Pigment wetting is determined with pigmented polymer solutions (50% by weight of titanium dioxide pigment, based on solid resin) which were adjusted to a flowout viscosity of 20 seconds at 20° C. (DIN-4-cup). The lacquer solutions thus diluted are cast onto glass plates and dried vertically at room temperature. After drying, the homogeneity of the film is assessed, very good pigment wetting indicating complete homogeneity and very poor pigment wetting indicating flocculation of the film (inhomogeneity).

The expression "dust-dry" is defined as follows: a plug of cottonwool 2 to 3 cm in diameter is dropped from a height of 20 cm onto a horizontal substrate. After an interval of about 10 seconds, an attempt is made to remove the cottonwool plug by blowing. The layer is dust-dry when no more fibres adhere to the surface.

The expression "tack-free" is defined as follows: the substrate with the layer of lacquer on top is placed on a tared balance which is loaded with a 1 kg counterweight. A small grease-free plug of cottonwool 2 to 3 cm in diameter is placed on the lacquer layer and small metal disc 2 cm in diameter placed on top. The disc is then pressed with the finger until the balance is in equilibrium and the balance is held in equilibrium for 10 seconds. After the metal disc has been removed, an attempt is made to remove the cottonwool plug by gentle blowing. The layer of lacquer is tack-free when the plug no longer adheres to the lacquer layer and also leaves no fibres behind.

The pendulum hardnesses quoted were determined in seconds in accordance with Konig after drying in air for 16 hours, cf. W. Konig, Farbe und Lack, 59, (1953), page 435. The lower the value obtained, the softer the film.

The Erichsen indentation (elasticity of the film) is measured in mm in accordance with DIN 53 156. The higher the value obtained, the more elastic the film.

The Gardner gloss is measured in accordance with ASTM D-523-T.

Table 1

| Properties of white lacquers with a dry film thickness of 50 μm | Ex. 1 A | Ex. 1 B | Comparison 1 A | Comparison 1 B | Ex. 2 A | Comparison 2 A | Comparison 3 A | Ex. 3 A | Comparison 4 A | Comparison 5 A | Comparison 6 A | Comparison 7 A |
|---|---|---|---|---|---|---|---|---|---|---|---|---|
| Pigment wetting[1] | 0 | 0 | 0 | 0 | 0 | 0 | 0 | 0 | 0 | 0 | 0 | 0 |
| Dust-dry (in mins.) | 40 | 40 | 40 | 30 | 30 | 30 | 30 | 30 | 30 | 30 | 20 | 30 |
| tack-free (after hours) | 2.5 | 2.5 | approx. 10 | approx. 16[2] | 4 | 2.5 | 4 | 2 | 5 | 8 | 1.5 | 2.5 |
| Film properties after drying for 16 hours at 20° C | | | | | | | | | | | | |
| Pendulum hardness | 38s | 29 | Lacquer gels after 1ᵈ, hence no further tests possible | 15 | 23 | 19 | 19 | 36 | 16 | 15 | 32 | 32 |
| Fingernail hardness[1] | 0 | 1 | | 2 | 2 | 3 | 3 | 0 | 1 | 2 | 0 | 1–2 |
| Resistance to marking with tape[1] | 0 | 0 | | 4 | 0 | 0 | 0 | 0 | 5 | 0 | 5 | 5 |
| Super-grade petrol test[1] | 2 | 2 | | 2–3 | 2–3 | 3 | 3–4 | 2 | 5 | 3 | 5 | 4–5 |
| Oversprayability[3] | 2 | 3 | | 5 | 2–3 | 5 | 4 | 1–2 | 5 | 2 | 3 | 3 |
| Whiteness[1] | 0 | 1 | | 0 | 1 | 3 | 1 | 1 | 1 | 1 | 0 | 0 |
| Erichsen indentation after 3ᵈ 20° C | 9mm | 9 | | 9 | 9 | 9 | 9 | 9 | 9 | 9 | 9 | 9 |
| after 10ᵈ 70° C | 9mm | 9 | | 6 | 9 | 9 | 9 | 9 | 9 | 9 | 1 | 9 |
| Gardner gloss (20° angle) after 3ᵈ 20° C | 85 | 86 | | 84 | 90 | 88 | 83 | 88 | 89 | 80 | 91 | 85 |
| after 10ᵈ 70° C | 81 | 83 | | 80 | 81 | 80 | 74 | 85 | 85 | 76 | 88 | 81 |
| Properties of film after drying for 45 mins. at 70° C | | | | | | | | | | | | |
| Pendulum hardness | 28s | 34 | | 17 | 22 | 18 | 16 | 30 | 20 | 14 | 60 | 35 |
| Fingernail hardness[1] | 1–2 | 1 | | 2–3 | 2 | 3 | 3 | 1 | 2 | 2 | 0 | 1 |

[1] General evaluation scale: 0 = excellent, 1 = very good, 2 = good, 3 = satisfactory, 4 = inadequate, 5 = very poor
[2] Without anti-skinning agent 3 hours; however, lacquer is not stable in storage
[3] The film dried for 16 hours at 20° C is oversprayed with the same lacquer. 0 = no destruction of film in the dried second layer, 5 = completely raised/wrinkled.

We claim:

1. An air-drying lacquer binder, comprising a copolymer of average molecular weight from about 3,000 to 20,000, as determined in tetrahydrofuran by the vapor pressure reduction method, comprising copolymerised units of
   20 to 55% by weight of styrene,
   5 to 30% by weight of glycidyl(meth)acrylate, and
   0 to 50% by weight of at least one (meth)acrylic acid ester with 1 to 10 carbon atoms in the alcohol component,
which has been esterified with
   0 to 15% by weight of at least one natural, drying fatty acid, and
   10 to 50% by weight of isomerised drying fatty acids (the sum of the percentage contents amounting to 22–50% by weight) based on the copolymer and drying fatty acids and dicarboxylic acid anhydride subsequently used, up to an acid number of < 10, from 30 to 75% by weight of the isomerised drying fatty acids containing conjugated double bonds, and wherein the hydroxyl groups formed have subsequently been reacted with from 0.5 to 3% by weight, based on the total components of the binder, of tetrahydrophthalic acid anhydride or at least one isomer thereof or a mixture of these anhydrides.

2. An air-drying lacquer binder as claimed in claim 1, wherein
   0 to 10% by weight of natural, drying fatty acids, and
   25 to 40% by weight of isomerised, drying fatty acids are used as the drying fatty acids, from 40 to 60% by weight of the isomerised, drying fatty acids containing conjugated double bonds.

3. A lacquer binder as claimed in claim 1, wherein the copolymer comprises copolymerised units of
   20 to 45% by weight of styrene,
   10 to 25% by weight of glycidyl acrylate, glycidyl methacrylate or a mixture thereof, and
   10 to 30% by weight of at least one ester of acrylic or methacrylic acid with 1 to 4 C-atoms in the alcohol component.

4. A lacquer binder as claimed in claim 1, wherein the fatty-acid-modified copolymer is reacted with 0.5 to 3% by weight of tetrahydrophthalic acid anhydride to form a semiester having an acid number of from 5 to 15.

* * * * *